(12) United States Patent
Hall et al.

(10) Patent No.: US 9,330,039 B2
(45) Date of Patent: May 3, 2016

(54) CROSSTALK AWARE ENCODING FOR A DATA BUS

(71) Applicant: INTEL CORPORATION, Santa Clara, CA (US)

(72) Inventors: Stephen H. Hall, Forest Grove, OR (US); Chaitanya Sreerama, Hillsboro, OR (US); Jason A. Mix, Hillsboro, OR (US); Michael W. Leddige, Beaverton, OR (US); Jose A. Sanchez Sanchez, Tlaquepaque (MX); Olufemi B. Oluwafemi, Hillsboro, OR (US); Paul G. Huray, Georgetown, SC (US); Maynard C. Falconer, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 663 days.

(21) Appl. No.: 13/726,748

(22) Filed: Dec. 26, 2012

(65) Prior Publication Data

US 2014/0181357 A1  Jun. 26, 2014

(51) Int. Cl.
*G06F 13/40* (2006.01)

(52) U.S. Cl.
CPC .................................. *G06F 13/4022* (2013.01)

(58) Field of Classification Search
CPC .................................................. G06F 13/4022
See application file for complete search history.

(56) References Cited

U.S. PATENT DOCUMENTS

| 6,094,464 | A  | * | 7/2000  | Ebringer et al. ............... 375/342 |
|-----------|----|---|---------|----------------------------------------|
| 6,128,112 | A  |   | 10/2000 | Harres                                 |
| 6,624,873 | B1 |   | 9/2003  | Callahan, Jr. et al.                   |
| 7,583,209 | B1 | * | 9/2009  | Duan ............................... 341/80 |
| 2006/0179358 | A1 |  | 8/2006 | Cordero et al. |
| 2007/0058744 | A1 | * | 3/2007 | Amirkhany et al. ........... 375/260 |
| 2007/0229324 | A1 | * | 10/2007 | Visalli et al. ..................... 341/51 |
| 2007/0271535 | A1 | * | 11/2007 | Hwang et al. ..................... 716/5 |
| 2010/0189186 | A1 |  | 7/2010 | Zerbe |
| 2013/0208579 | A1 | * | 8/2013 | Strobel et al. ................. 370/201 |
| 2013/0266046 | A1 | * | 10/2013 | Sudhakaran et al. .......... 375/219 |

FOREIGN PATENT DOCUMENTS

| CN | 104050119 A | 9/2014 |
| EP | 1164758 A2 | 12/2001 |
| EP | 2778940 A2 | 9/2014 |

(Continued)

OTHER PUBLICATIONS

International Search Report and Written Opinion received for PCT Patent Application No. PCT/US2013/047642, mailed on Oct. 7, 2013, 11 pages.

(Continued)

*Primary Examiner* — Nimesh G Patel
(74) *Attorney, Agent, or Firm* — International IP Law Group, P.L.L.C.

(57) ABSTRACT

Techniques for encoding data are described herein. An example of a device in accordance with the present techniques includes a signaling module coupled to a plurality of digital inputs. The signaling module is to encode data received at the plurality of digital inputs to generate encoded data. Based on the encoded data, the signaling module can drive line voltages on a plurality of signal lines of a bus. Each one of the plurality of line voltages corresponds to a weighted sum of the data received at the plurality of digital inputs.

24 Claims, 14 Drawing Sheets

(56) References Cited

FOREIGN PATENT DOCUMENTS

| JP | 2001-144620 A | 5/2001 |
|---|---|---|
| KR | 10-2011-0004801 A1 | 1/2011 |
| TW | 200705452 | 2/2007 |

OTHER PUBLICATIONS

Chang, Kuei-Chung, "Reliable network-on-chip design for multicore system-on-chip", The Journal of Supercomputing, Kluwer Academic Publishers, BO, vol. 55, No. 1, Dec. 23, 2009, pp. 86-102, XP019865181, ISSN: 1573-0484, DOI: 10.1007/S11227-009-0376-4 (17 pages).

Partial European Search Report issued by the European Patent Office on Nov. 13, 2014 for European Patent Application No. 14160003.1 (2 pages).

Yan, Zhou et al: "S-parameter based multimode signaling", Electrical Performance of Electronic Packaging and Systems (EPEPS), 2012 IEEE 21st Conference on, IEEE, Oct. 21, 2012, pp. 11-14, XP032328688, DOI: 10.1109/EPEPS.2012.6457832, ISBN: 978-1-4673-2539-4 (4 pages).

\* cited by examiner $$W = \begin{array}{|c|c|c|c|} \hline W_{1,1} & W_{1,2} & \cdots & W_{1,N} \\ \hline W_{2,1} & W_{2,2} & \cdots & W_{2,N} \\ \hline \vdots & \vdots & \ddots & \vdots \\ \hline W_{N,1} & W_{N,2} & \cdots & W_{N,N} \\ \hline \end{array}$$

$$W = \begin{array}{|c|c|c|c|} \hline 1 & -1 & 1 & 1 \\ \hline 1 & -1 & -1 & -1 \\ \hline 1 & 1 & -1 & 1 \\ \hline 1 & 1 & 1 & -1 \\ \hline \end{array}$$

$$\mathbf{I} = W^{-1} = \begin{array}{|c|c|c|c|} \hline I_{1,1} & I_{1,2} & \cdots & I_{1,N} \\ \hline I_{2,1} & I_{2,2} & \cdots & I_{2,N} \\ \hline \vdots & \vdots & \ddots & \vdots \\ \hline I_{N,1} & I_{N,2} & \cdots & I_{N,N} \\ \hline \end{array}$$

$$\mathbf{I} = \begin{array}{|c|c|c|c|} \hline 0.25 & 0.25 & 0.25 & 0.25 \\ \hline -0.25 & -0.25 & 0.25 & 0.25 \\ \hline 0.25 & -0.25 & -0.25 & 0.25 \\ \hline 0.25 & -0.25 & 0.25 & -0.25 \\ \hline \end{array}$$

CROSSTALK AWARE ENCODING FOR A DATA BUS

TECHNICAL FIELD

This disclosure relates generally to techniques for reducing crosstalk between signal lines in a computing device. More specifically, the disclosure describes encoding techniques that reduce crosstalk between the signal lines of a data bus.

BACKGROUND

Modern computing devices continue to incorporate a growing number of components into smaller device chassis. As chassis volumes are decreased, the routing density of the data busses between components increases, which results in corresponding increases in crosstalk noise between the signal lines of the data bus. Crosstalk tends to reduce bus performance, which tends to limit the data rate at which a data bus can successfully transfer data between components. One way of reducing crosstalk in a data bus is to increase the signal line spacing, which limits the degree of miniaturization that can be achieved.

BRIEF DESCRIPTION OF DRAWINGS

FIG. 5 is an encoding matrix, W, used by an N-input encoder, where N corresponds to the number of signal lines controlled by the encoder.

FIG. 6 is an example of an encoding matrix for a four-input encoder.

FIG. 7 is decoding matrix, I, used by an N-input encoder, where N corresponds to the number of signal lines coupled to the decoder.

FIG. 8 is an example of an encoding matrix for a four-input decoder.

DETAILED DESCRIPTION

The subject matter disclosed herein relates to signaling techniques for transmitting information between components in a digital system, such as a memory bus on a motherboard, for example. Each of the components can include an Input/Output (I/O) transmitter with an encoding block and an I/O receiver with a decoding block. The data sent between the components is encoded and decoded such that the negative effects of crosstalk are removed and signal quality is enhanced. The signaling techniques disclosed herein provide significant increases in both routing density and bus speeds on packages, printed circuit boards (PCBs), multi-chip modules (MCMs) and multi-chip packages (MCPs). Increasing the routing density and bus speed enables more functionality to be designed into a smaller volume and helps facilitate the scaling of computer performance in accordance with Moore's Law.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Figure 1:
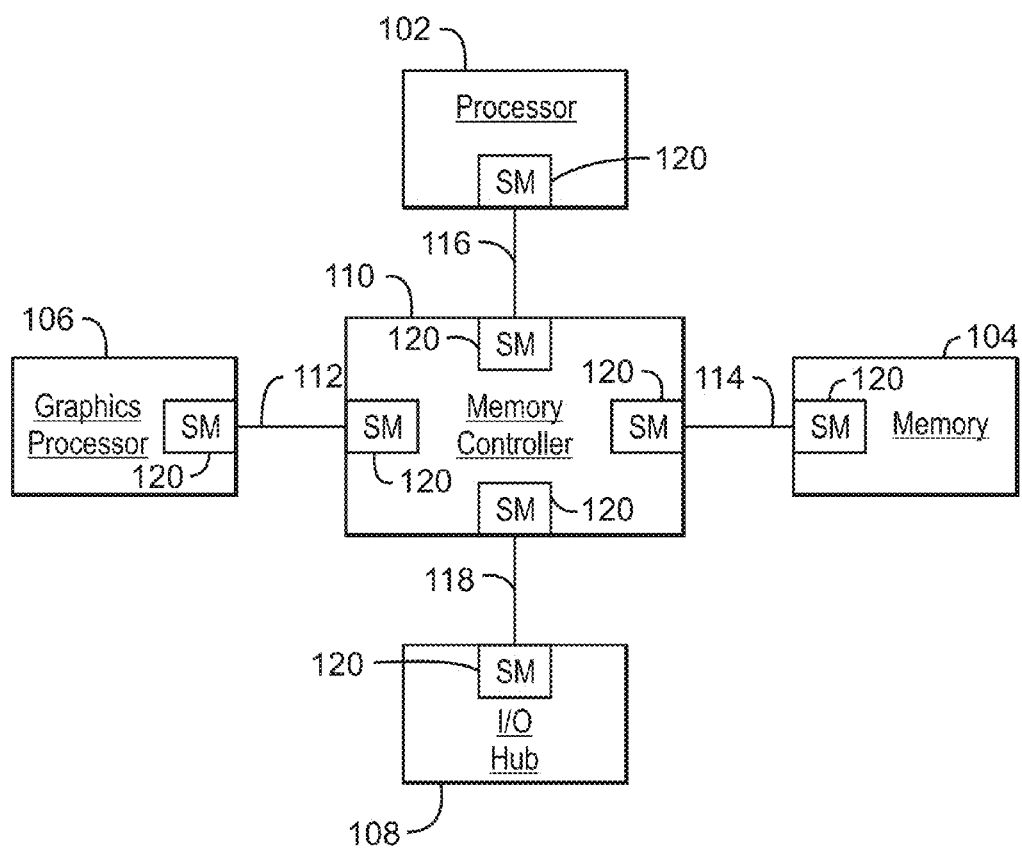
FIG. 1 is a block diagram of an example of a computing system with a signaling module that reduces crosstalk.

FIG. 1 is a block diagram of an example of a computing system with a signaling module that reduces crosstalk. The computing system 100 may be, for example, a mobile phone, laptop computer, ultrabook, desktop computer, server, or tablet computer, among others. The computing system 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The processor 102 may be implemented as Complex Instruction Set Computer (CISC) or Reduced Instruction Set Computer (RISC) processors, x86 Instruction set compatible processors, multi-core, or any other microprocessor or central processing unit (CPU). In some embodiments, the processor 102 includes dual-core processor(s), dual-core mobile processor(s), or the like.

The memory device 104 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. The memory device 104 can be used to store computer-readable instructions that, when executed by the processor, direct the processor to perform various operations in accordance with embodiments described herein.

The computing system 100 may also include a graphics processor 106 that processes computer generated graphics. The graphics processor 106 is configured to process memory related to the generation of graphics to be sent to a display (not shown). The display may be a built-in component of the computing system 100 externally connected to the computing system 100. The computing system 100 can also include an I/O hub 108 used to connect and control additional I/O devices (not shown), such as network interface controllers, memory storage devices, user input devices, among others. The I/O devices coupled to the I/O hub 108 may be built-in components of the computing system 100, or may be devices that are externally connected to the computing system 100.

The computing system 100 may also include a memory controller hub 110 that handles communications between the processor 102, memory 104, graphics processor 106, and I/O hub 110. Communications between the various components of the computing system 100 can be performed over various data buses. For example, the graphics processor 106 can be coupled to the memory controller 110 through a graphics bus 112. The memory 104 can be coupled to the memory controller 110 through a memory bus 114. The data bus between the processor 102 and the memory controller 110 may be referred to as the front side bus 116. The data bus between the memory controller 110 and the I/O hub may be referred to as the internal bus 118.

In some embodiments, the processor 102, graphics processor 106, memory device 104, memory controller 110, and I/O hub 108 may be separate integrated circuit chips coupled to a mother board. In some embodiments, one or more of the processor 102, graphics processor 106, memory device 104, memory controller 110, and I/O hub 108 may be included in a multi-chip module (MCM), multi-chip package (MCP), or system-on-a-chip (SOC). Depending on the design considerations of a particular implementation, the signal lines of the one or more of the busses 112, 114, 116, 118 may disposed, at least in part, on one or more circuit boards.

The computing system 100 also includes signaling modules 120 that facilitate digital communications between the components coupled to the respective bus. Each signaling module 120 receives a digital signal and generates voltage signals that propagate on the signal lines of the various busses. As explained further below, the voltage signals are encoded by the signaling module in a way that reduces the effects of crosstalk between the signal lines of the data bus. A respective signaling module 120 may be coupled to or included in any component of the computing device 100 that transmits data over a data bus that uses single-ended communications. For example, signaling modules may be included in the processor 102, graphics processor 106, memory device 104, memory controller 110, and I/O hub 108, among others.

It is to be understood that the block diagram of FIG. 1 is not intended to indicate that the computing system 100 is to include all of the components shown in FIG. 1. Rather, the computing system 100 can include fewer or additional components not illustrated in FIG. 1. Furthermore, the components may be coupled to one another according to any suitable system architecture, including the system architecture shown in FIG. 1 or any other suitable system architecture that uses a data bus to facilitate single-ended communications between components. For example, embodiments of the present techniques can also be implemented any suitable electronic device, including ultra-compact form factor devices, such as System-On-a-Chip (SOC) and multi-chip modules. It could also be used on any electrical cable inside or outside of a computer that is used to carry digital information from one point to another. For example, embodiments of the present techniques may be used for connecting disk drives.

Figure 2:
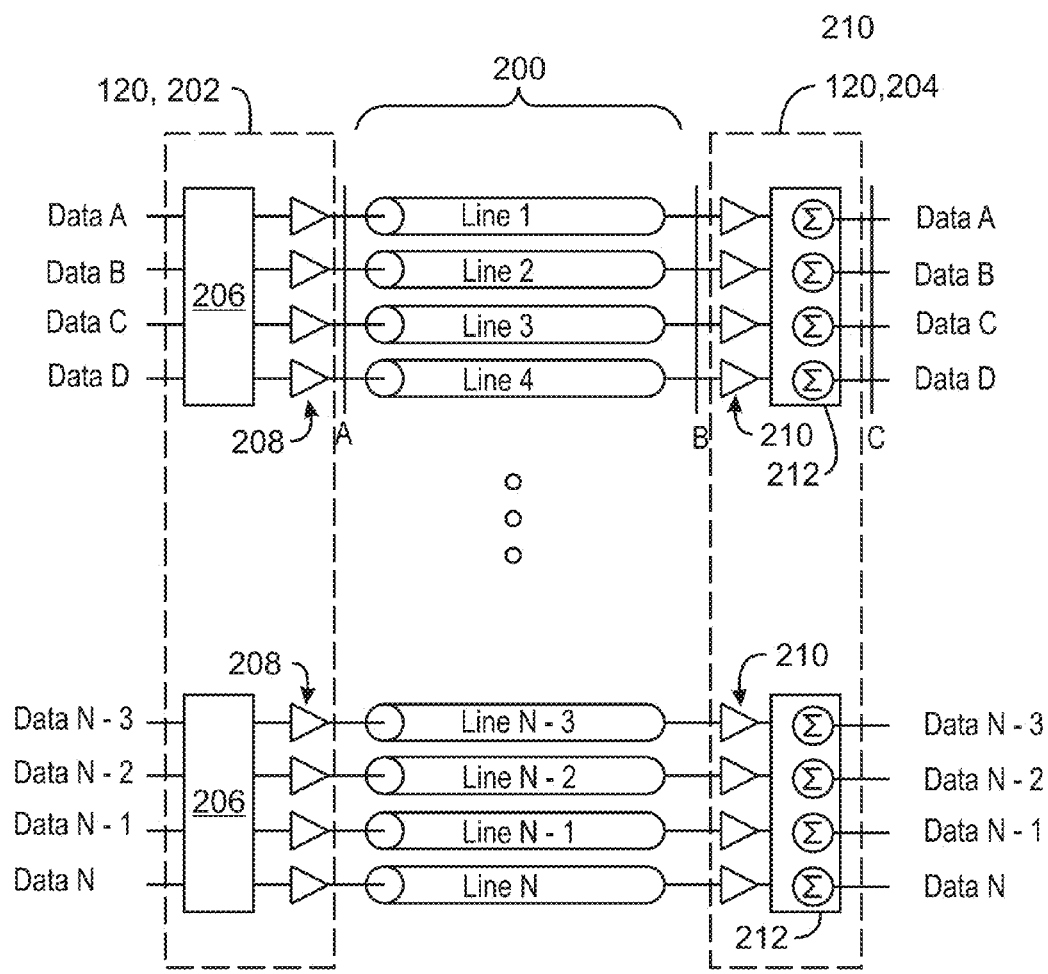
FIG. 2 is a block diagram showing an example of pair of signaling modules at the driving and receiving end of a bus.

FIG. 2 is a block diagram showing an example of pair of signaling modules at the driving and receiving end of a bus. Specifically, FIG. 2 shows two signaling modules 120 communicatively coupled through a data bus 200 comprising N signal lines, where N can be any suitable number, including but not limited to 2, 4, 16, 32, 64, or 128. In some embodiments, the signal lines are strip lines or micro-strip lines disposed, at least partially, on a circuit board. In some embodiments, the signal lines are disposed, at least partially, in an SOC, multichip-module, or one or more cables. For purposes of the present description, the signaling modules 120 are referred to herein as a transmitting module 202 and a receiving module 204. For the sake of clarity, the transmitting module 202 is shown as including the components used in transmitting, while the receiving module 204 is shown as including the components used in receiving. However, it will be appreciated that in some embodiments, each signaling module 120 will include components for both transmitting and receiving data through the data bus.

The transmitting module 202 includes one or more encoders 206 for encoding the data to be transmitted over the bus 200. The encoder 206 includes a number of digital inputs for receiving digitally encoded data from an electronic component (not shown). The digital inputs to the encoder are referred to in FIG. 2 as "Data A" through "Data N". The output of the encoder 206 is coupled to a plurality of transmitters 208, each of which receives a signal from the encoder 206 and transmits a corresponding voltage signal on its respective signal line. The encoder 206 encodes the data transmitted over the bus 200 in such a way that the negative effects of crosstalk are removed and signal quality is enhanced.

The receiving module 204 includes receivers 210 coupled to each of the signal lines. Each receiver 210 receives the analog signal transmitted by the respective transmitter 208 of the transmitting module 202 and provides an input signal to a respective decoder 212. The decoder 212 decodes the data transmitted over the data bus 200 and transmits digital data to a receiving electronic component (not shown). Each decoder 212 of the receiving module 204 is paired with a respective encoder 206 of the transmitting module 206.

As shown in FIG. 2, each encoder 206 can control four of the signal lines of the data bus 200. However, in some embodiments, each encoder 206 can control any suitable number of signal lines up to the total number of signal lines of the data bus 200. In some embodiments, such as the one shown in FIG. 2, the data bus 200 is divided between a number of encoder/decoder pairs. In some embodiments, the transmitting module includes a single encoder 206 and the receiving module includes a single decoder 212.

Throughout the present description, reference may be made to nodes which serve as reference points for explaining the present techniques. Specifically, node A refers to the output of the transmitters 208 of the transmitting module 202, node B refers to the input of the receivers 210 of the receiving module 204, and node C refers to the digital output of the decoder 212 at the receiving module 204.

As explained further below, the data inputs for a single encoder 206 (for example, Data A through Data D) are encoded such that the crosstalk from neighboring signal lines becomes a part of the signal transmitted over each signal line. In some embodiments, the encoder 206 uses an encoding matrix to generate the transmitted line voltages, so that the line voltage driven on a particular signal line is a weighted sum of all of the digital inputs to the encoder 206. The encoding adjusts the voltage waveform on each signal line such that, upon decode, the crosstalk from the neighboring lines is removed. In some embodiments, the decoder 212 decodes the received line voltages using decoding matrix that is the transpose or inverse of the encoding matrix.

Figure 3:
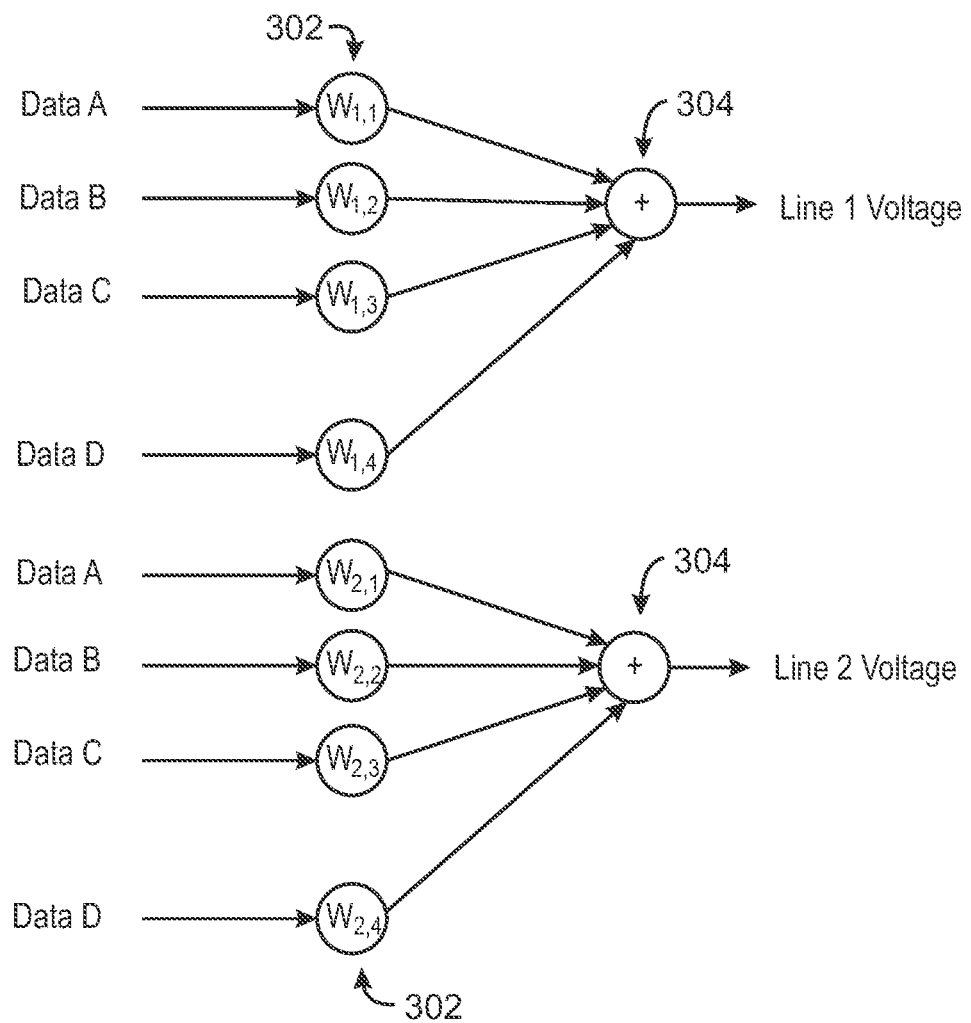
FIG. 3 is a diagram of an encoding process used by the encoder.

FIG. 3 is a diagram of an encoding process used by the encoder. Specifically, FIG. 3 is a mathematical representation of the encoding process used by a four-input encoder, such as one of the encoders 206 of FIG. 2. The diagram 300 of FIG. 2 shows a number of data inputs, Data A through Data D, which correspond with the four data inputs of the same name shown in FIG. 2. The diagram 300 of FIG. 2 also shows a number of output line voltages, referred to as Line 1 voltage and Line 2 voltage. Line 1 voltage represents the voltage driven on the signal line referred to as "Line 1" in FIG. 2, and Line 2 voltage represents the voltage driven on the signal line referred to as "Line 2" in FIG. 2. It will be appreciated that the four-input encoder will also include a Line 3 voltage and a Line 4 voltage (not shown).

As shown in FIG. 3, the encoder may include weighting logic and summing logic. Data A through Data D are the binary voltage levels (For example, 1's and 0's) at the input of the encoder. For each line voltage, the encoder weights each of the four data inputs, Data A through Data D, according to specified weighting parameters, $W_{ij}$, 302 and the weighted inputs are then added by a summer 304. The output of each summer 304 is used to control the transmitter to drive the corresponding line voltage. After encoding the input data, each of the line voltages will be proportional to the weighted sum of each of the data inputs coupled to the encoder.

As shown in FIG. 3, encoding is based on a weighted sum of input data information from the victim and aggressor lines. For purposes of the present description, the term "aggressor line" refers to the source of the crosstalk noise, and the term "victim line" refers to the receiver of the crosstalk noise. The encoding matrix is constructed such that the noise coupled from aggressor to victim lines becomes part of the signal thus removing the negative attributes of crosstalk. The input data information may either consist of the input binary data stream (logical ones and zeros) or their pre-driven voltage values. The weights, $W_{ij}$, may be unique for each input and may be a unique set for each victim line considered. The subscripts i and j indicate victim line number and aggressor line number, respectively. The weighting parameters, $W_{ij}$, 302 may be specified according to a pre-defined weighting scheme, which is explained further below, in relation to FIGS. 5 and 6, each of which show the weighting parameters assembled into matrix form.

The process shown in FIG. 3 may be implemented in any suitable hardware, including logic circuits, one or more processors configured to execute computer-readable instructions, and the like. Furthermore, although FIG. 3 shows a diagram of a four-input encoder, the same technique may be used in an encoder with any suitable number data inputs.

Figure 4:
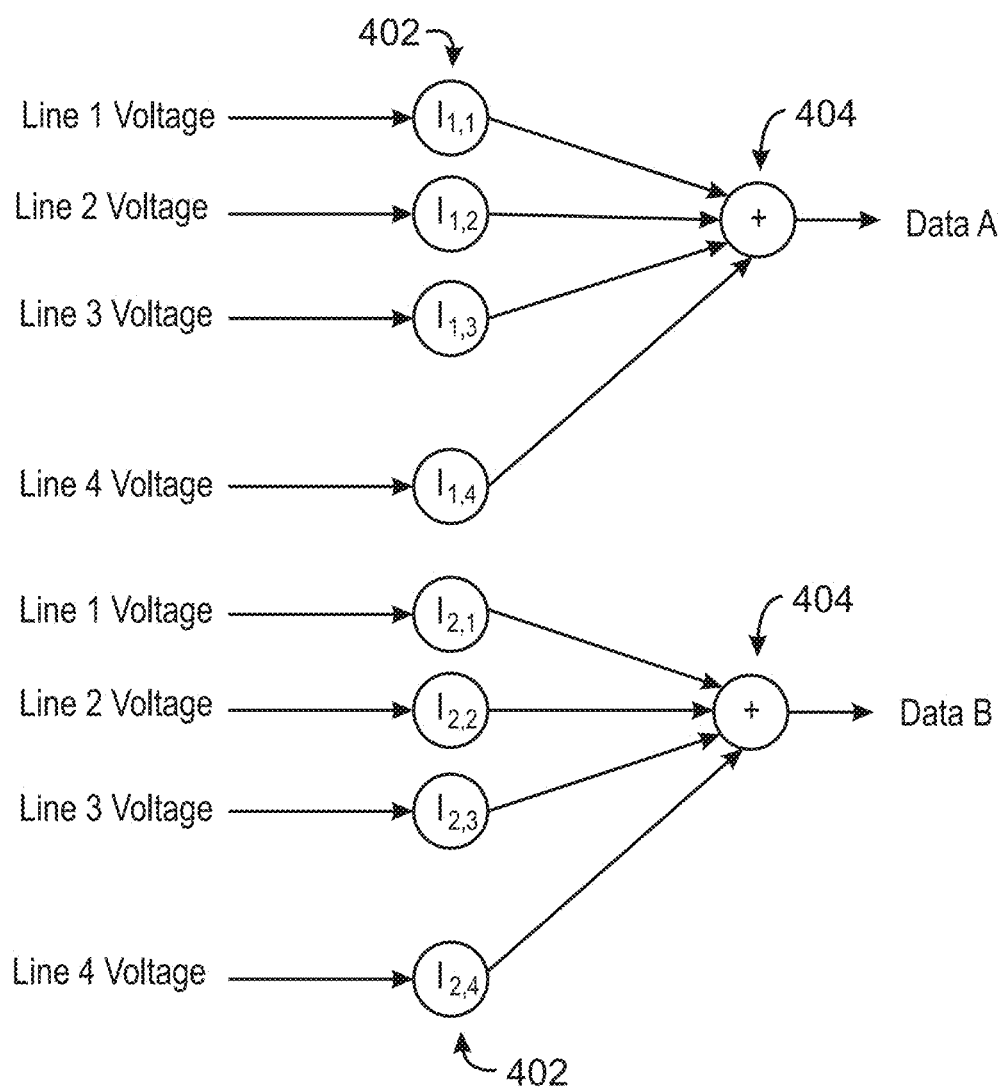
FIG. 4 is a diagram of a decoding process used by the decoder.

FIG. 4 is a diagram of a decoding process used by the decoder. Specifically, FIG. 4 is a mathematical representation of the decoding process used by the decoder 212 that is paired with the encoder 206 of FIGS. 2 and 3. The diagram 400 of FIG. 2 shows a number of line voltage inputs, Line 1 through Line 4, which correspond with the signal lines of the same name shown in FIG. 2. The diagram 400 of FIG. 4 also shows a number of data outputs, referred to as Data A and Data B. The Data A and Data B outputs represent the data outputs of the same name shown in FIG. 2. It will be appreciated that the four-output decoder of FIG. 4 will also include a Data C output and Data D output (not shown).

As shown in FIG. 4, the decoder may include weighting logic and summing logic. For each data output, the decoder weights each of the four line voltages received over the data bus, according to specified weighting parameters, $I_{ij}$, 402 and the weighted line voltages are then added by a summer 404. The line voltages from each signal line are multiplied by corresponding weighting terms, $I_{i,j}$. The subscripts i and j indicate victim line number and aggressor line number, respectively. The output of each summer 404 is used to generate a corresponding digital data output. After decoding the line voltage data, each of the data outputs will be proportional to the weighted sum of each of the line voltages coupled to the decoder. The decoder output referred to as Data A is a digital signal that represents the digital data that was input to the corresponding encoder at the transmitting side of the data bus, which is also referred to as Data A in both FIGS. 2 and 3. The weighting parameters, $I_{ij}$, 402 may be specified according to a pre-defined weighting scheme, which is explained further below, in relation to FIGS. 7 and 8.

The process shown in FIG. 4 may be implemented in any suitable hardware, including logic circuits, one or more processor configured to execute computer-readable instructions, and the like. Furthermore, although FIG. 4 shows a diagram of a four-output decoder, the same technique may be used in a decoder with any suitable number data outputs.

FIG. 5 is an encoding matrix, W, used by an N-input encoder, where N corresponds to the number of signal lines controlled by the encoder. The encoding matrix is a matrix of weighting parameters used to encode the digital data received by the encoder. The size of the encoding matrix will depend on the number of signal lines controlled by the encoder. The weighting parameters, $W_{ij}$, may be specified such the crosstalk between each of the signal lines controlled by the encoder will be reduced, while still ensuring that the digital data input to the encoder can be reproduced by the decoder.

Weights may be signed real numbers or integers and are chosen such that crosstalk is minimized and voltage limits of the transmitter and receiver devices are not violated. When combined in matrix form, standard linear algebra can be used to encode the data as shown in equation 1.

$$V_A = (V_{input})^T \cdot W^T \qquad \text{Eq. 1}$$

In equation 1, $V_A$ is a column vector listing encoded voltages to be transmitted onto the interconnect at node A in FIG. 2, $W_T$ is the transpose of the weighting matrix 500, and $V_{input}$ is the input column vector that contains the binary information that is to be transmitted onto the bus (the binary input to the encoder). The voltages, $V_A$, are combined as described by equation 1 and driven out onto the physical signal lines of the bus 200.

The weighting parameters may be assigned real numbers, complex numbers, or integers and are chosen such that crosstalk is minimized and voltage limits of the transmitter and receiver devices are not violated. Once data is transmitted across the channel, crosstalk is effectively removed from the signals and the binary data can be recovered. To minimize crosstalk, the weighting parameters may be specified according to specific rules. For a channel with N signal lines, the weighting parameters represent unique combinations of the data that can be sent on the lines such that the rules expressed in equations 2 and 3 are satisfied.

$$\sum_{i=1}^{N} W_{ij} \cdot W_{ik} = 0 \text{ if } j \neq k; \qquad \text{Eq. 2}$$

and $$\sum_{i=1}^{N} W_{ij} \cdot W_{ik} = Y \text{ if } j = k, \qquad \text{Eq. 3}$$

where Y is a constant

Equation 2 indicates that the dot product between any two columns of the encoding matrix 500 is zero. Equation 3 indicates that the sum of squares for each column of the encoding matrix 500 is an integer constant.

FIG. 6 is an example of an encoding matrix for a four-input encoder. The four-input encoding matrix satisfies the conditions expressed in Equations 2 and 3. The four-input encoding matrix may be used in the four-input encoder 206 shown in FIG. 2 and represented in FIG. 3. It should be noted that the values that comprise the encoding matrix W can be any suitable value and do not need to be identical as shown in the example of FIG. 6.

FIG. 7 is decoding matrix, I, used by an N-input encoder, where N corresponds to the number of signal lines coupled to the decoder. The decoding matrix is a matrix of weighting parameters used to decode the line voltages received by the decoder. The size of the encoding matrix will depend on the number of signal lines coupled to the decoder. To ensure that the digital data can be reproduced by the decoder, the weighting parameters, $I_{ij}$, may be specified such that the decoding matrix, I, is the transpose or inverse of the encoding matrix, W, as represented in Equation 4. Note that the nomenclature for the weighting parameters $I_{ij}$ should not be confused with the identity matrix.

$$W^{-1} = X * W^T, \text{ where } X \text{ is a constant} \qquad \text{Eq. 4}$$

In Equation 4, X is a scaling factor which may be specified to ensure that the voltage or power levels received by the decoder do not exceed the operating limits of the decoder circuitry. The decoding process reverses the operations of the encoding process. An example of a linear algebra equation used for the decoding process is shown below as Equation 5.

$$(V_C)^T = V_B \cdot (W^T)^{-1} \qquad \text{Eq. 5}$$

In Equation 5, $V_C$ is the recovered binary bit stream at node C of FIG. 2, $W^T$ is the transpose of the encoding matrix, and $V_B$ is the sampled encoded data at node B. After the decoding process, the encoded line voltages are converted back to binary voltages and the digital bit stream is recovered.

FIG. 8 is an example of a decoding matrix for a four-input decoder. The four-input decoding matrix is the transpose of the encoding matrix shown in FIG. 6, multiplied by a scaling factor of 0.25. Although a scaling factor of 0.25 is used in the present example, it will be appreciated that the decoding matrix can use any suitable scaling factor, depending on the design considerations of a particular implementation. The four-input decoding matrix may be used in the four-input decoder 206 shown in FIG. 2 and represented in FIG. 4.

Figure 9A:
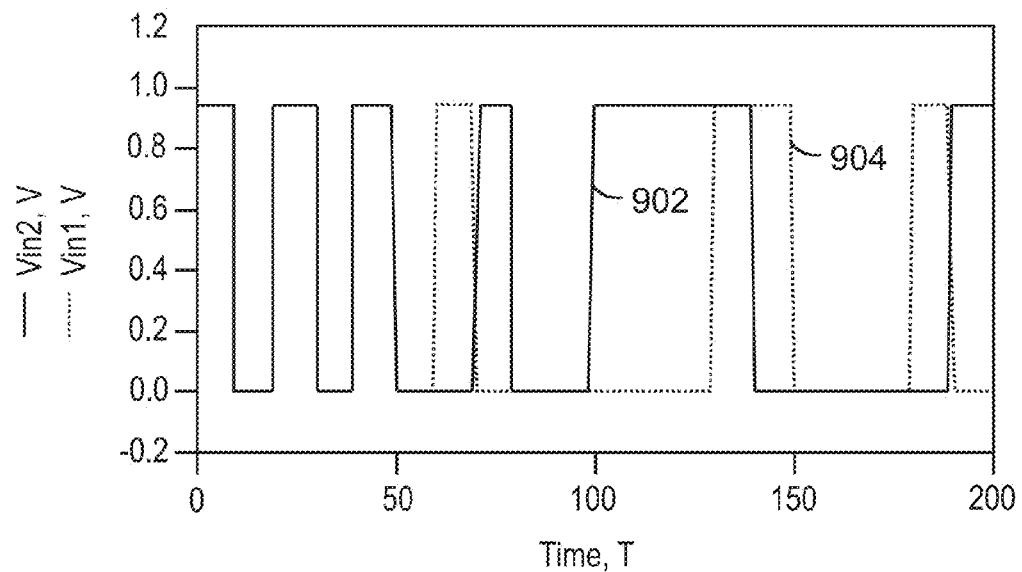
FIGS. 9A-D are graphs representing a simulation of the encoding and decoding process implemented by a pair of signaling modules.

FIGS. 9A-D are graphs representing a simulation of the encoding and decoding process implemented by a pair of signaling modules. FIG. 9A is a graph 900 showing binary input data to be transmitted over a data bus. Specifically, graph 900 shows two binary data streams, including a first data stream 902 represented by the solid line and a second data stream 904 represented by the dotted line. For reference, the horizontal axis is divided into arbitrary units of time, T. Both of the binary data streams 902 and 904 can be can be input to the encoder. For the sake of clarity, FIGS. 9A-9D show two input data streams. However, it will be appreciated that the encoder can encode any suitable number of input data streams, depending on the number of signal lines controlled by the encoder. As shown in the example data of FIG. 9A, the binary data streams 902 and 904 are identical for the three clock cycles occurring from T=0 to T=50.

Figure 9B:
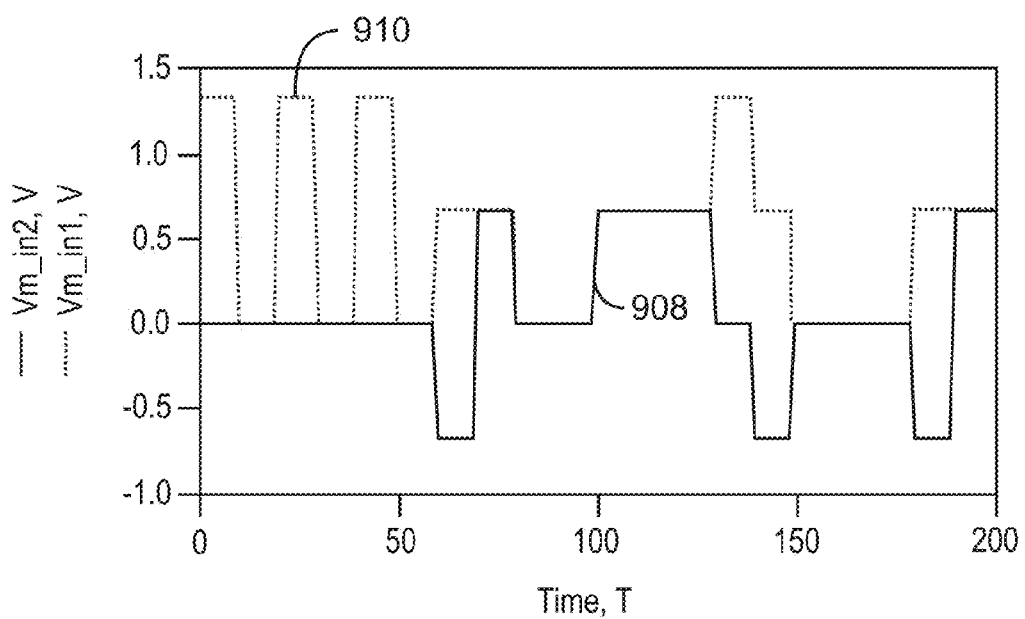

FIG. 9B is a graph showing the transmitted encoded data corresponding to the binary data streams of FIG. 9A. The encoded data represents signals 908 and 910 produced at node A (FIG. 2), which is transmitted over the signal lines of the bus. Specifically, the first signal 908 corresponds with the first data stream 902 and the second signal 910 corresponds with the second data stream 904. It can be seen that after the binary data streams are encoded, the data may no longer be binary. As shown in FIG. 9B, the data transmitted over the signal lines has three signal levels. The data transmitted over the signal lines can include additional signal levels depending on the number of signal lines controlled by the encoder and the corresponding size of the encoding matrix. For example, for a four-input encoding matrix, the data transmitted over the signal lines may have up to 4 signal levels. For an eight-input encoding matrix, the data transmitted over the signal lines may have up to 8 signal levels.

The advantages of the present techniques can be appreciated by examining the signal data from T=0 to T=50. From T=0 to T=50, the first signal 908 corresponding to the first data stream 902 (FIG. 9A) is zero. Thus, the crosstalk from the first signal 908 to the second signal 910 will be effectively eliminated during this time frame.

Figure 9C:
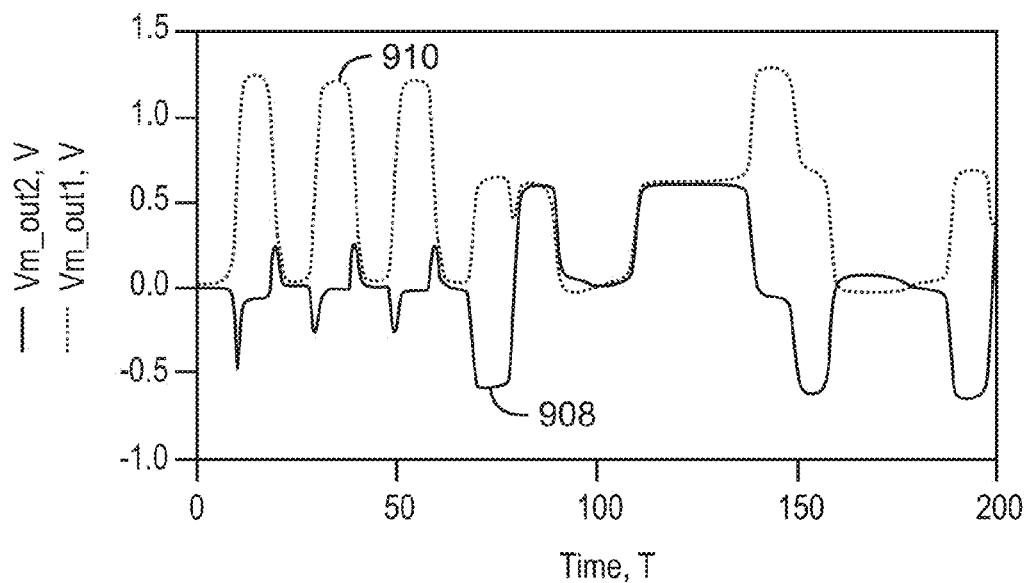

FIG. 9C is a graph 912 showing the received encoded data corresponding to the binary data streams of FIG. 9A. The received encoded data, represented by signals 908 and 910, is the data received by the encoder at node B (see FIG. 2) after being transmitted over the bus. As can be seen in FIG. 9C, the signals have experienced some degree of crosstalk between the signal lines as a result of the transmission over the bus. For example, over the T=0 to T=50 time frame, the first signal 908 corresponding to the first data stream 902 (FIG. 9A) has experienced some degree of crosstalk from the second signal 910 corresponding to the second data stream 904 (FIG. 9A). However, the overall crosstalk between the signal lines is significantly reduced. For example, within the T=0 to T=50 time frame, the second signal 910 corresponding to the second data stream 904 has experienced no crosstalk from the first signal 908 corresponding to the first data stream 902.

Figure 9D:
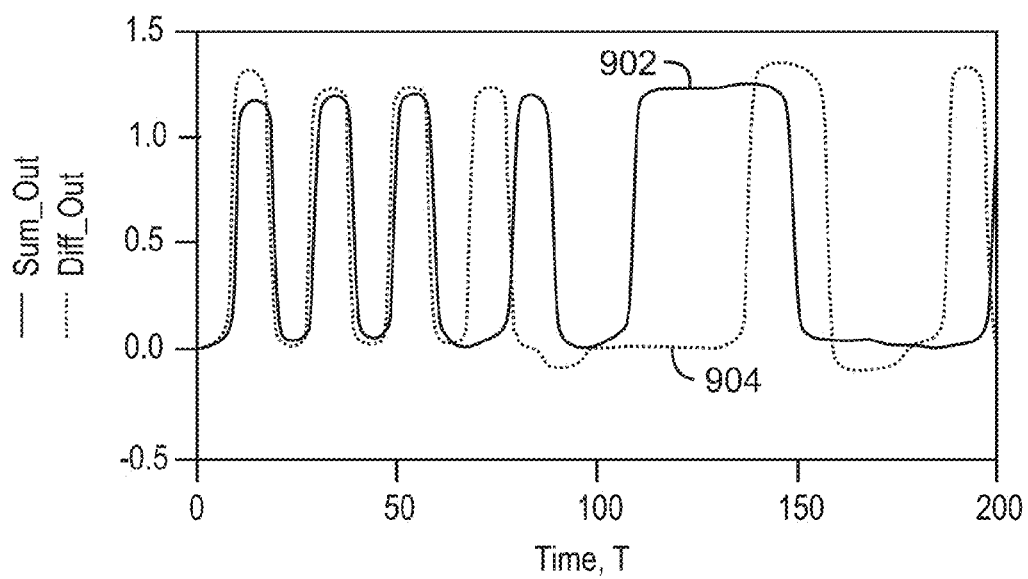

FIG. 9D is a graph 916 showing the decoded data corresponding to the binary data of streams of FIG. 9A. Specifically, the decoded data is the digital data output by the decoder at node C (see FIG. 2) after being transmitted over the bus. As can be seen in FIG. 9D, the binary data streams 902 and 904 have been reproduced by the decoder. Thus, the negative effect of crosstalk has been significantly reduced and both of the original bit patterns have been recovered.

Figure 10A:
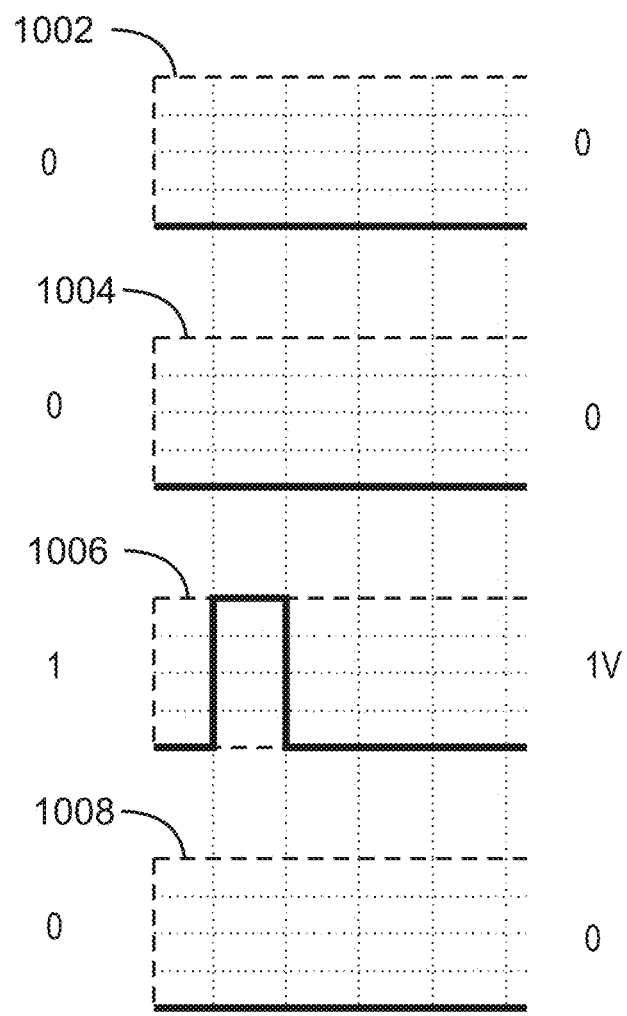
FIGS. 10A and 10B are graphs showing the results of the encoding process performed by a four-input encoder encoding a single bit of binary data.
Figure 10B:
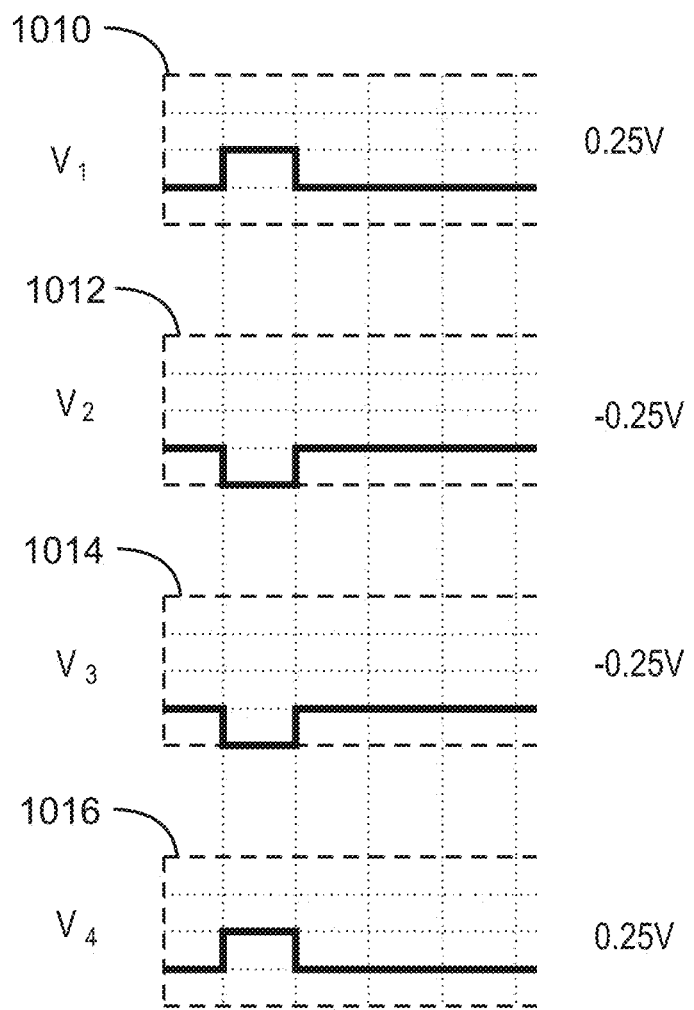

FIGS. 10A and 10B are graphs showing the results of the encoding process performed by a four-input encoder encoding a single bit of binary data. FIG. 10A includes four graphs that show an example of the binary input data that may be input to the four-input encoder, such as one of the encoders 206 shown in FIG. 2. For example, with reference to FIG. 2, the graph 1002 can represent Data A, graph 1004 can represent Data B, graph 1006 can represent Data C and graph 1008 can represent data D. In this example, Data A equals logical 0, Data B equals logical 0, Data C equals logical 1, and Data D equals logical 0. Furthermore, in this example, logical 1 corresponds with a voltage level of approximately 1 Volt. However, the actual voltage levels used to represent the binary data may be any suitable voltage levels depending on the design considerations of a particular implementation.

FIG. 10B includes four graphs that show the corresponding signals to be transmitted over the bus after the binary input data of FIG. 10A has been encoded. For example, with reference to FIG. 2, the graph 1010 represents the signal to be transmitted over Line 1, the graph 1012 represents the signal to be transmitted over Line 2, the graph 1014 represents the signal to be transmitted over Line 3, and the graph 1016 represents the signal to be transmitted over Line 4. As shown in FIG. 10B, signal line 1 (graph 1010) and signal line 4 (graph 1016) will see a 0.25 volt pulse, while signal line 2 (graph 1012) and signal line 4 (graph 1014) with see a −0.25 volt pulse. Thus, the bit information corresponding to the single bit of binary data shown in graph 1006 FIG. 10A has been spread between the four signal lines. This helps to minimize the crosstalk in a number of ways. For example, the magnitude of the crosstalk between the signal lines may be reduced due to the magnitude of the transmitted signal being reduced. Furthermore, as a result of the encoding process, the voltages carried on the signal lines may have opposite polarities in some cases, which results in crosstalk cancellation between some of the signal lines. For example, signal line 1 (graph 1010) and signal line 4 (graph 1016) will see a positive 0.25 volt pulse, while signal line 2 (graph 1012) and signal line 4 (graph 1014) with see a negative 0.25 volt pulse. Thus, in this example, the crosstalk received by signal line 3 from signal lines 2 and 4 will be of opposite polarity and will cancel one another out. Thus, the crosstalk received by signal line 3 will be approximately equal to the crosstalk received by signal line 1 only.

Figure 11A:
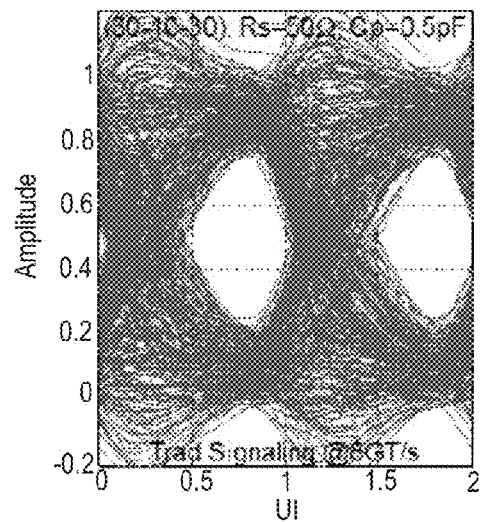
FIGS. 11A and 11B are eye diagrams that show the improved crosstalk reduction provided by the techniques described herein.
Figure 11B:
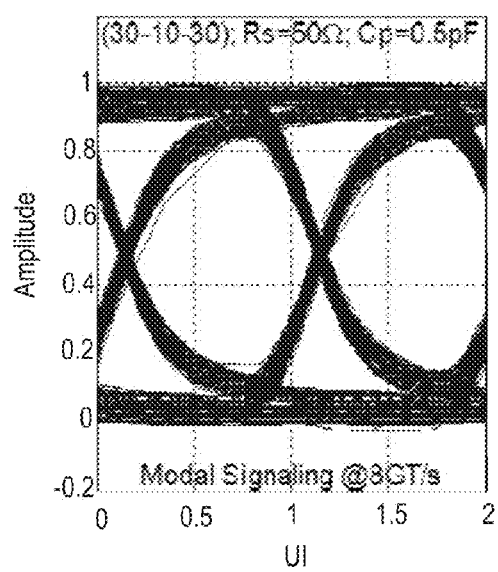

FIGS. 11A and 11B are eye diagrams that show the improved crosstalk reduction provided by the techniques described herein. An eye diagram, also referred to as an eye pattern, is a tool for evaluating the quality of a digital signal. An open eye pattern indicates a low level of signal distortion. Closure of the eye diagram indicates distortion of the waveform due to crosstalk and other factors.

FIGS. 11A and 11B are simulated eye diagrams of an 8 Gigatransfer per second (GT/s) bus with a signal line trace width of 30 micrometers and a trace-to-trace space of 50 micrometers, resulting in a bandwidth per unit area of $4 \times 10^6$ GT/s/m². The eye diagram of FIG. 11A represents a traditional bus, and the eye diagram of FIG. 11B represents the eye diagram that results when the data is encoded according to the techniques described herein instead of conventional binary signaling. As can be seen from a comparison of the eye diagrams of FIGS. 11A and 11B, the encoding techniques described herein result in a more open eye diagram, which indicates a significant reduction in crosstalk between the signal lines.

Figure 12A:
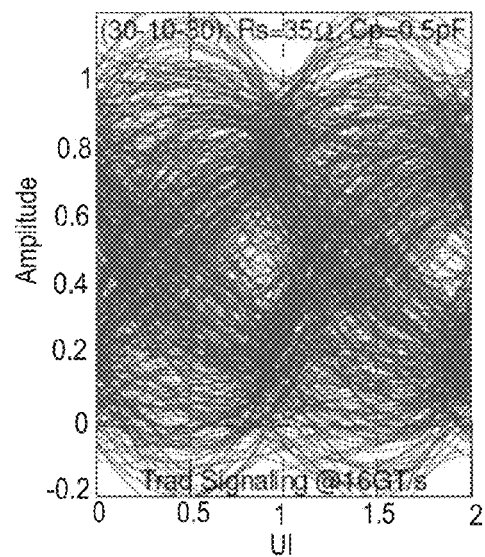
FIGS. 12A and 12B are simulated eye diagrams of a 16 GT/s bus with a signal line trace width of 30 micrometers and a trace-to-trace space of 10 micrometers showing improved crosstalk reduction provided by the techniques described herein.
Figure 12B:
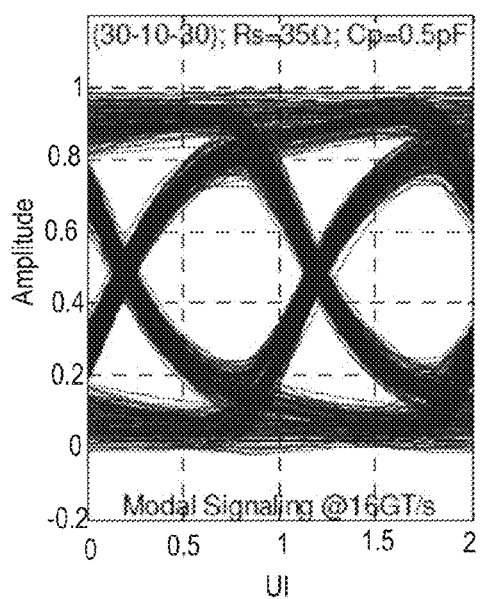

FIGS. 12A and 12B are simulated eye diagrams of a 16 GT/s bus with a signal line trace width of 30 micrometers and a trace-to-trace space of 10 micrometers showing improved crosstalk reduction provided by the techniques described herein. The bus represented in FIGS. 12A and 12B results in a bandwidth per unit area of $16 \times 10^6$ GT/s/m². The eye diagram of FIG. 12A represents a traditional bus, and the eye diagram of FIG. 12B represents the eye diagram that results when the data is encoded according to the techniques described herein. As shown in FIG. 12A, the eye diagram is completely closed, indicating that the traditional bus will not function properly at the simulated bandwidth density due to crosstalk between the signal lines. By comparison, the eye diagram of FIG. 12B is still open, indicating that the encoding techniques described herein have successfully mitigated crosstalk such that the encoded data can still be successfully recovered at the higher bandwidth density.

Figure 13A:
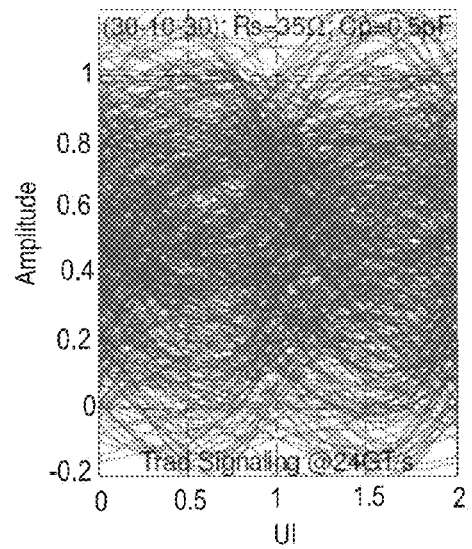
FIGS. 13A and 13B are simulated eye diagrams of a 24 GT/s bus with a signal line trace width of 30 micrometers and a trace-to-trace space of 10 micrometers showing improved crosstalk reduction provided by the techniques described herein.
Figure 13B:
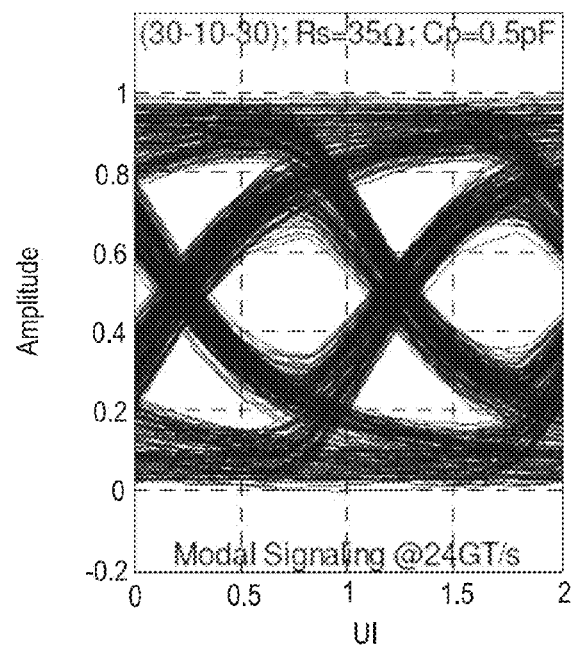

FIGS. 13A and 13B are simulated eye diagrams of a 24 GT/s bus with a signal line trace width of 30 micrometers and a trace-to-trace space of 10 micrometers showing improved crosstalk reduction provided by the techniques described herein. The bus represented in FIGS. 13A and 13B result in a bandwidth per unit area of $24 \times 10^6$ GT/s/m². The eye diagram of FIG. 13A represents a traditional bus, and the eye diagram of FIG. 13B represents the eye diagram that results when the data is encoded according to the techniques described herein. As shown in FIG. 13A, the eye diagram is completely closed, indicating that the traditional bus will not function properly at the simulated bandwidth density due to crosstalk between the signal lines. By comparison, the eye diagram of FIG. 13B is still open, indicating that the encoding techniques described herein have successfully mitigated crosstalk such that the encoded data can still be successfully recovered at the higher bandwidth density.

As demonstrated by the simulations described above, the encoding techniques described herein successfully mitigate the fundamental limitations of crosstalk on high speed buses, which can facilitate significant improvements in bus speed, routing density, and routing lengths. In some embodiments, the trace-to-trace spacing for buses, such as OPI and eDRAM buses, can be reduced from 50 microns to 10 microns with a corresponding data rate increase from 8 gigabits per second to 24 gigabits per second. In some embodiments, the trace-trace spacing for PCB level routings such as DDR, can be reduced from 15 mils to 4 mils with a corresponding data rate increase from 2 gigabits per second to 10 gigabits per second.

Figure 14:
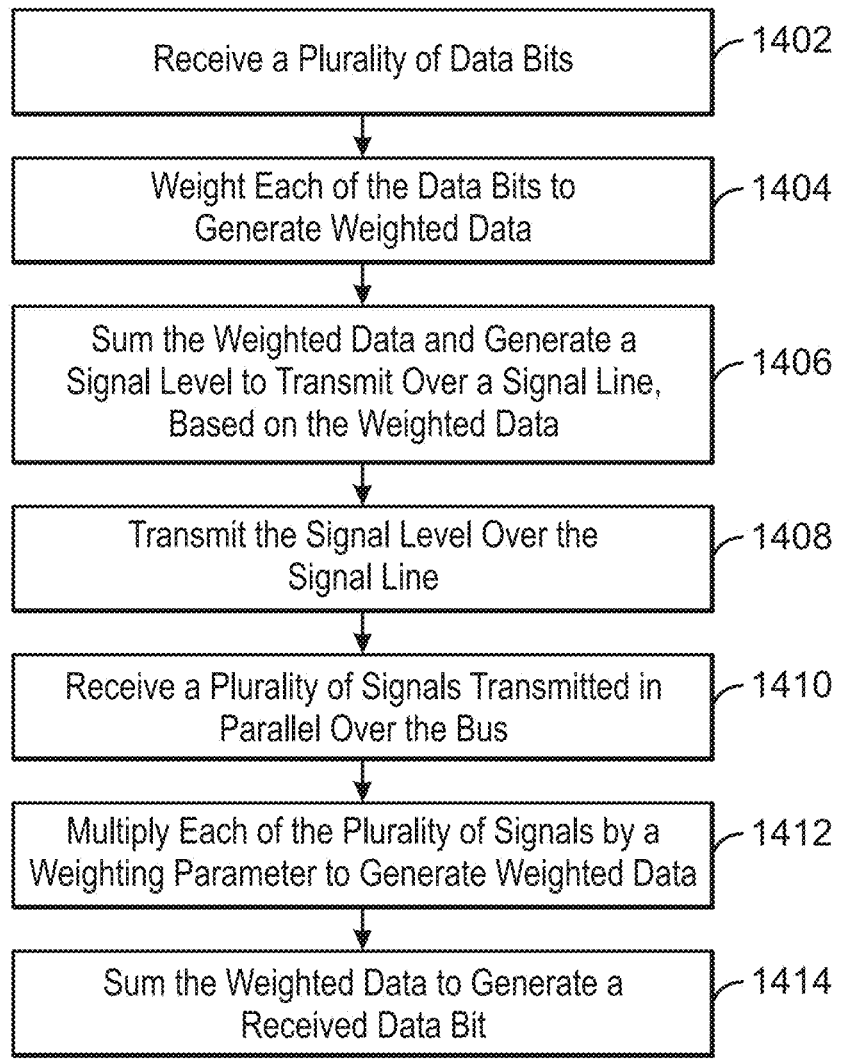
FIG. 14 is a process flow diagram summarizing a method of encoding and decoding data.

FIG. 14 is a process flow diagram summarizing a method of encoding and decoding data. The method 1400 can be performed by one or more signaling modules such the signaling modules shown in FIG. 1. The method 1400 may be implemented by logic included in the signaling module, for example, in the encoder 206 and decoder 212 shown in FIG. 2. The logic is embodied in hardware, such as logic circuitry or one or more processors configured to execute instructions stored in a non-transitory, computer-readable medium. The method may begin at block 1402, wherein a plurality of data bits is received by an encoder. The data bits are received in parallel, which means that each data bit is received at approximately the same time and each data bit corresponds to a different data stream.

At block 1404, each of the data bits is weighted to generate weighted data. For example, each of the data bits can be multiplied by a weighting parameter received from an encoding matrix. As discussed above, the encoding matrix may be a matrix wherein the dot product between any two columns of the encoding matrix is zero and the sum of squares for each column of the encoding matrix is an integer constant.

At block 1406, the weighted data can be summed. The summed, weighted data may be used to generate a signal level to be transmitted over a signal line. For example, the encoder can use the result of the summation to generate a control signal used to control a transmitter, such that the transmitted signal is proportional to a weighted sum of the each of the inputs to the encoder.

At block 1408, the signal level is transmitted over the signal line. Blocks 1402 through 1408 can be performed in parallel for each signal line controlled by the encoder, such that each signal level generated will be generated using a different column of weighting parameters from the encoding matrix.

At block 1410, a plurality of signals are received after being transmitted over a bus. The plurality of signals can be signals that were transmitted by an encoder following the process detailed in blocks 1402 through 1406.

At block 1412, each of the plurality of signals may be multiplied by a weighting parameter to generate weighted data. The weighting parameters may be obtained from a decoding matrix that is the transpose of the encoding matrix used by the encoder at block 1404.

At block 1414, the weighted data may be summed to generate a received data bit. The received data bit will have the same value as one of the data bits received by the encoder at block 1402. Blocks 1410-1414 may be repeated for each data bit to be received, depending on the number of signal lines coupled to the decoder. At the end of the process, each of the data bits received by the encoder will be reproduced by the decoder.

Example 1

An integrated circuit chip is described herein. The integrated circuit chip includes a signaling module coupled to a plurality of digital inputs. The signaling module is configured to encode data received at the plurality of digital inputs to generate encoded data. Based on the encoded data, the signaling module can drive line voltages or currents on a plurality of signal lines of a bus, wherein each one of the plurality of line voltages corresponds to a weighted sum of the data received at the plurality of digital inputs.

Example 2

An electronic device is described herein. The electronic device includes a bus with a plurality of signal lines. The electronic device also includes a first signaling module coupled to a plurality of digital inputs. The first signaling module is configured to encode data received at the plurality of digital inputs and drive signals on the plurality of signal lines of the bus, wherein each one of the plurality of signals corresponds to a weighted sum of the data received at the plurality of digital inputs. The electronic device also includes a second signaling module coupled to the plurality of signal lines of the bus. The second signaling module is configured to decode the plurality of signals received over the bus and generate a corresponding plurality of digital outputs, wherein the values of the plurality of digital outputs are equal to the values of the plurality of digital inputs.

Example 3

An electronic device is described herein. The electronic device includes logic to receive a plurality of data bits in parallel, wherein each data bit corresponds to a different data stream and the plurality of data bits comprises a first data bit. The electronic device also includes logic to weight each of the data bits to generate weighted data. The electronic device also includes logic to sum the weighted data and generate, based on the sum of the weighted data, a signal level to transmit over a signal line, wherein the signal level is to be decoded to reproduce the first data bit.

Example 4

A system is described herein. The system includes a bus comprising a plurality of signal lines. The system also includes a first transmitting module coupled to a plurality of digital inputs, the first transmitting module to encode data received at the plurality of digital inputs and drive signals on the plurality of signal lines of the bus, wherein each one of the plurality of signals corresponds to a weighted sum of the data received at the plurality of digital inputs.

Some embodiments may be implemented in one or a combination of hardware, firmware, and software. Some embodiments may also be implemented as instructions stored on the tangible non-transitory machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An integrated circuit chip, comprising:
  a signaling module coupled to a plurality of digital inputs, the signaling module to:
    encode data received at the plurality of digital inputs to generate encoded data, wherein to encode the data comprises to weight the data based, at least in part, on an encoding matrix, wherein a dot product between any two columns of the encoding matrix is approximately zero and the sum of squares for each column of the encoding matrix is non-zero; and
    based on the encoded data, drive line voltages or currents on a plurality of signal lines of a bus, wherein each one of the plurality of line voltages corresponds to a weighted sum of the data received at the plurality of digital inputs.

2. The integrated circuit chip of claim 1, wherein the signaling module comprises a decoder coupled to the plurality of signal lines of the bus, the decoder to couple to a second encoder of a second signaling module through the bus and decode signal data received from the second encoder.

3. The integrated circuit chip of claim 2, wherein the decoder decodes the signal data using a decoding matrix that is the transpose of the encoding matrix.

4. The integrated circuit chip of claim 1, wherein the integrated circuit chip is a central processing unit, micro controller, IO hub, chipset, memory controller hub (MCH) of a digital system.

5. The integrated circuit chip of claim 1, wherein the integrated circuit chip is a graphics processor.

6. An electronic device, comprising:
   a bus comprising a plurality of signal lines;
   a first signaling module coupled to a plurality of digital inputs, the first signaling module to encode data received at the plurality of digital inputs and drive signals on the plurality of signal lines of the bus, wherein to encode the data comprises to weight the data based, at least in part, on an encoding matrix, wherein a dot product between any two columns of the encoding matrix is approximately zero and the sum of squares for each column of the encoding matrix is non-zero, and wherein each one of the plurality of signals corresponds to a weighted sum of the data received at the plurality of digital inputs;
   a second signaling module coupled to the plurality of signal lines of the bus, the second signaling module to decode the plurality of signals received over the bus and generate a corresponding plurality of digital outputs, wherein the values of the plurality of digital outputs are equal to the values of the plurality of digital inputs.

7. The electronic device of claim 6, wherein the second signaling module comprises a decoder coupled to the plurality of signal lines of the bus, the decoder to decode the plurality of signals received over the bus using a decoding matrix that is the transpose or inverse of the encoding matrix.

8. The electronic device of claim 6, wherein the electronic device is a tablet PC, Ultrabook, desktop, or server.

9. The electronic device of claim 6, wherein the electronic device is a mobile phone.

10. The electronic device of claim 6, wherein a trace-to-trace spacing between the plurality of signal lines of the bus is less than approximately 20 microns.

11. The electronic device of claim 6, wherein a bandwidth density of the bus is greater than approximately 16 Gigatransfers per second per meter squared.

12. An electronic device, comprising:
   logic to receive a plurality of data bits in parallel, wherein each data bit corresponds to a different data stream and the plurality of data bits comprises a first data bit;
   logic to weight each of the data bits to generate weighted data, wherein the logic to weight each of the data bits is to weight the data based, at least in part, on an encoding matrix, wherein a dot product between any two columns of the encoding matrix is approximately zero and the sum of squares for each column of the encoding matrix is non-zero;
   logic to sum the weighted data and generate, based on the sum of the weighted data, a signal level to transmit over a signal line, wherein the signal level is to be decoded to reproduce the first data bit.

13. The electronic device of claim 12, wherein the logic to weight each of the data bits, comprises logic to multiply each of the data bits by a weighting parameter received from the encoding matrix.

14. The electronic device of claim 12, comprising:
   logic to receive a plurality of signals transmitted in parallel over the bus from a second integrated circuit chip;
   logic to multiply each of the plurality of signals by a weighting parameter to generate weighted data; and
   logic to sum the weighted data to generate a received data bit.

15. The electronic device of claim 12, comprising logic to obtain the weighting parameters from a decoding matrix that is the transpose or inverse of the encoding matrix.

16. A system comprising:
   a bus comprising a plurality of signal lines;
   a first transmitting module coupled to a plurality of digital inputs, the first transmitting module to encode data received at the plurality of digital inputs and drive signals on the plurality of signal lines of the bus, wherein to encode the data comprises to weight the data based, at least in part, on an encoding matrix, wherein a dot product between any two columns of the encoding matrix is approximately zero and the sum of squares for each column of the encoding matrix is non-zero, and wherein each one of the plurality of signals corresponds to a weighted sum of the data received at the plurality of digital inputs.

17. The system of claim 16, comprising at least a second transmitting module coupled to the bus, the second transmitting module coupled in parallel with the first transmitting module to control a different set of the plurality of signal lines compared to the first transmitting module.

18. The system of claim 16, wherein the bus is controlled by a plurality of transmitting modules, including the first transmitting module.

19. The system of claim 16, comprising a decoder coupled to the plurality of signal lines of the bus, the decoder to decode the plurality of signals received over the bus using a decoding matrix that is the transpose or inverse of the encoding matrix.

20. The system of claim 16, comprising a first receiving module coupled to the plurality of signal lines of the bus, the first receiving module to decode the plurality of signals received over the bus and generate a corresponding plurality of digital outputs, wherein the values of the plurality of digital outputs are equal to the values of the plurality of digital inputs.

21. The system of claim 20, the first receiving module to receive a plurality of signals transmitted in parallel over the bus from the first transmitting module, multiply each of the plurality of signals by a weighting parameter to generate weighted data, and sum the weighted data to generate a received data bit.

22. The system of claim 20, wherein the first receiving module is coupled to the first transmitting module through a cable connection.

23. The system of claim 20, wherein the first receiving module is coupled to the first transmitting module through a circuit board.

24. The system of claim 20, wherein the first transmitting module and the second transmitting module are disposed on the same integrate circuit chip.

* * * * *